United States Patent
Levi et al.

(10) Patent No.: US 10,789,579 B2
(45) Date of Patent: Sep. 29, 2020

(54) SYSTEMS AND METHODS FOR USE IN FACILITATING PURCHASES

(71) Applicant: MASTERCARD INTERNATIONAL INCORPORATED, Purchase, NY (US)

(72) Inventors: Karin J. Levi, Edgewater, NJ (US); David Javitch, Harrison, NY (US); Jia-Ming Yuan, Flushing, NY (US); Jo-Anne Loh, New York, NY (US); Jessica Miyono Phoa, Brooklyn, NY (US); Christine Chu, New York, NY (US); Jean Kim, Federal Way, WA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 303 days.

(21) Appl. No.: 15/625,582

(22) Filed: Jun. 16, 2017

(65) Prior Publication Data

US 2018/0365661 A1   Dec. 20, 2018

(51) Int. Cl.
*G06Q 20/08* (2012.01)
*G06Q 20/20* (2012.01)
(Continued)

(52) U.S. Cl.
CPC ....... *G06Q 20/0855* (2013.01); *G06F 21/629* (2013.01); *G06Q 20/108* (2013.01); *G06Q 20/202* (2013.01); *G06Q 20/3224* (2013.01); *G06Q 20/3274* (2013.01); *G06Q 20/36* (2013.01); *G06Q 20/3672* (2013.01);
(Continued)

(58) Field of Classification Search
CPC .............. G06Q 20/108; G06Q 20/202; G06Q 20/0855; G06Q 20/3224; G06Q 20/405; G06Q 50/14; G07C 9/27
See application file for complete search history.

(56) References Cited

U.S. PATENT DOCUMENTS 5,864,830 A * 1/1999 Armetta ................. G06Q 20/04
                                                           235/380
5,973,619 A * 10/1999 Paredes .................. G06Q 10/02
                                                           235/384

(Continued)

*Primary Examiner* — Florian M Zeender
*Assistant Examiner* — Whitney Poffenbarger
(74) *Attorney, Agent, or Firm* — Harness, Dickey & Pierce, P.L.C.

(57) ABSTRACT

Systems and methods are provided for facilitating purchase transactions for travel. One exemplary system comprises a memory including a user profile associated with a secondary user and a payment account, and a processor in communication with the memory. The processor is configured to access the user profile in the memory, and display an available destination for travel based on the user profile. The processor is also configured, in response to selection of the available destination, to display a travel option to the secondary for travel to the available destination, and in response to selection of the travel option, to provide a credential associated with the payment account, thereby permitting a point-of-sale computing device associated with a merchant of the selected travel option to capture the credential and initiate a purchase transaction for the selected travel option.

11 Claims, 8 Drawing Sheets

(51) Int. Cl.
*G06Q 50/14* (2012.01)
*G06Q 20/10* (2012.01)
*G06Q 20/32* (2012.01)
*G06Q 20/36* (2012.01)
*G06Q 20/40* (2012.01)
*G06F 21/62* (2013.01)
*G07C 9/27* (2020.01)

(52) U.S. Cl.
CPC ........... *G06Q 20/405* (2013.01); *G06Q 50/14* (2013.01); *G07C 9/27* (2020.01)

(56) References Cited

U.S. PATENT DOCUMENTS

| | | | | |
|---|---|---|---|---|
| 2001/0034720 | A1* | 10/2001 | Armes | G06Q 10/04 705/65 |
| 2001/0047310 | A1* | 11/2001 | Russell | G06Q 20/04 705/26.41 |
| 2014/0114705 | A1* | 4/2014 | Bashvitz | G06Q 50/14 705/5 |
| 2015/0227934 | A1* | 8/2015 | Chauhan | G06Q 20/4016 705/44 |
| 2015/0365787 | A1* | 12/2015 | Farrell | H04W 4/02 455/456.1 |
| 2016/0012465 | A1* | 1/2016 | Sharp | G06Q 20/18 705/14.17 |
| 2016/0321663 | A1* | 11/2016 | Batlle | G06Q 20/409 |
| 2016/0379215 | A1* | 12/2016 | Clerkin | G06O 20/20 705/44 |
| 2017/0061406 | A1* | 3/2017 | Adams | G06Q 20/108 |
| 2017/0132630 | A1* | 5/2017 | Castinado | G06Q 20/4014 |
| 2017/0330188 | A1* | 11/2017 | Canh | G06Q 20/385 |
| 2017/0346820 | A1* | 11/2017 | Valla | H04L 51/28 |
| 2018/0046944 | A1* | 2/2018 | Barbera | G06F 3/0482 |
| 2018/0060778 | A1* | 3/2018 | Guo | G01C 21/343 |
| 2018/0096445 | A1* | 4/2018 | Eyler | G01C 21/3438 |
| 2018/0225666 | A1* | 8/2018 | Khan | G06Q 20/20 |
| 2018/0315148 | A1* | 11/2018 | Luo | G06Q 50/30 |

\* cited by examiner

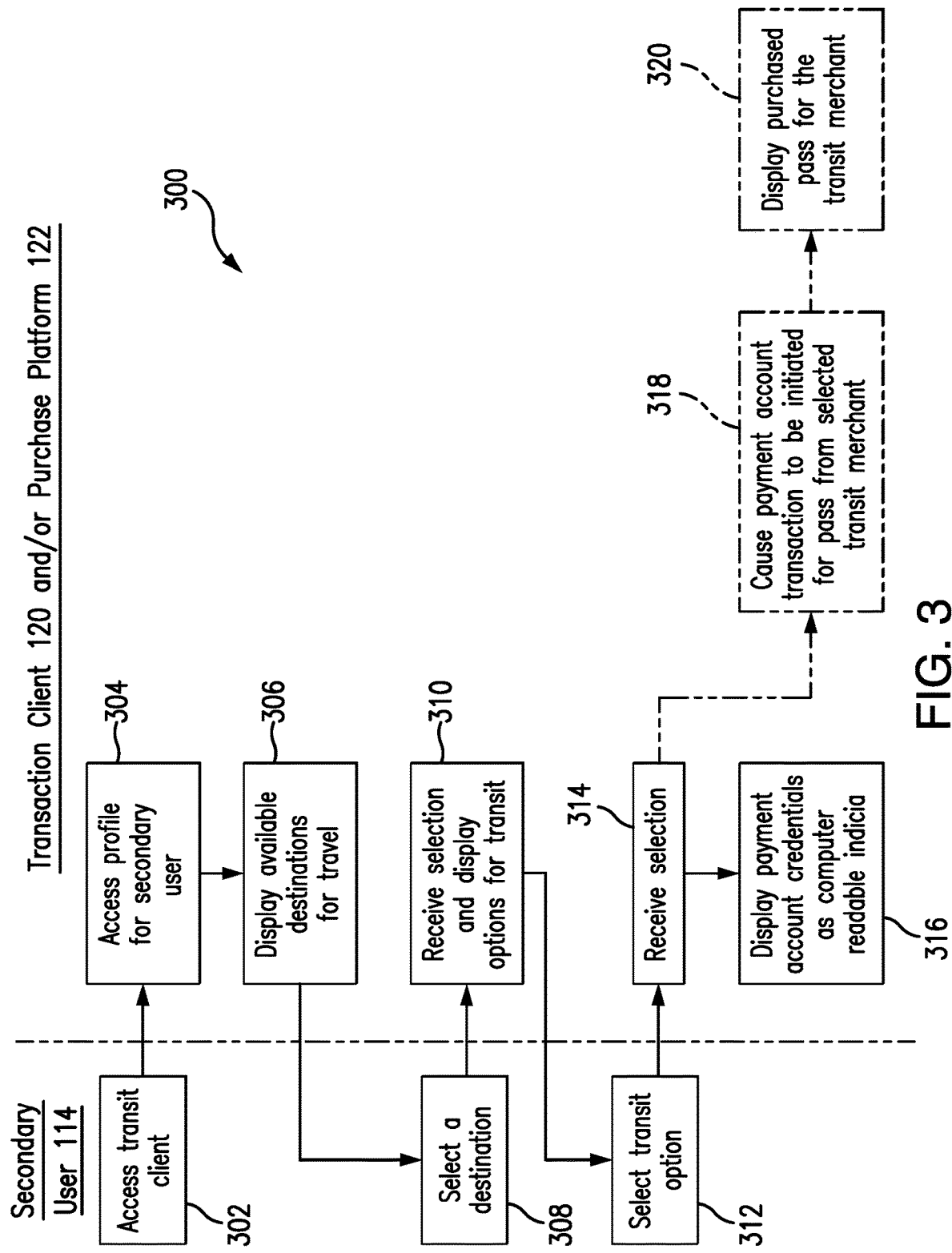

SYSTEMS AND METHODS FOR USE IN FACILITATING PURCHASES

FIELD

The present disclosure generally relates to systems and methods for use in facilitating purchases of products, and in particular, to systems and methods for use in providing a purchase platform, accessible by multiple persons, to provide purchase options for the persons regarding multiple different types of products including, for example, transit between locations, etc.

BACKGROUND

This section provides background information related to the present disclosure which is not necessarily prior art.

Consumers are known to purchase transit, such as, for example, taxi cab rides, train rides, subway rides, plane trips, etc., through use of payment accounts, cash, or even currency associated with the transit (e.g., subway tokens, etc.). In connection therewith, the consumers will often be present at the transaction and provide the cash, for example, to transit employees (e.g., taxi cab drivers, etc.), prior to being permitted to enter the means associated with the transit (e.g., the bus, plane, cab, or other vehicle, etc.). Certain network-based applications allow consumers to search, book and pay for travel, based on the route and journey times (e.g., the Moovel™ application). While other network-based applications permit the purchase of particular transit tickets on a mobile device (e.g., the MTA eTix® application allows consumers to purchase Long Island Rail Road and Metro-North Railroad tickets, etc.).

DRAWINGS

The drawings described herein are for illustrative purposes only of selected embodiments and not all possible implementations, and are not intended to limit the scope of the present disclosure.

FIG. 3 is an exemplary method for facilitating the purchase of transit, and which may be implemented in the system of FIG. 1;

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Options for travel to desired locations are often identified and purchased by users, whereby the users provide payment in the form of cash or through use of payment accounts, or otherwise. The use of funds in connection with the travel may be challenging depending on the types of users involved and, potentially, the source of funds for the travel. Uniquely, the systems and methods herein enable users to allocate funds for the purchase of transit by secondary users. In particular, a transaction client is provided for users that, together with a purchase platform in communication with the transaction client, permits a primary user to set up a profile to associate a payment account with the profile and provide funds to a profile associated with a secondary user (e.g., a child, a dependent, a minor, an employee, etc.) or multiple such secondary users. In turn, the secondary user (s), via the transaction client and the purchase platform, is/are able to view options for travel, to select a transit merchant for such travel, and to then spend the funds allocated to the secondary user's profile to purchase transit for the travel (or, in some embodiments, potentially spend the funds with even other non-transit merchants). In connection therewith, the primary user may be provided with status reports regarding the funds in the secondary user's profile (e.g., indicating how the funds are being used based on the underlying transactions, etc.), and also, potentially, statuses related to the travel of the secondary user(s) from place to place. The primary user also may be provided with controls related to the secondary user's use of the allocated funds for purchases at the transit merchants (or at the other non-transit merchants) (e.g., in the form of funding limits and/or category preferences on what, where and how much the secondary user may have for spending; etc.). In this manner, the transaction client and the purchase platform may cooperate to provide for more efficient and/or more secure management of travel for the secondary user(s) and of the funds provided by the primary user and associated with transit purchases by the secondary user(s) for the travel.

Figure 1:
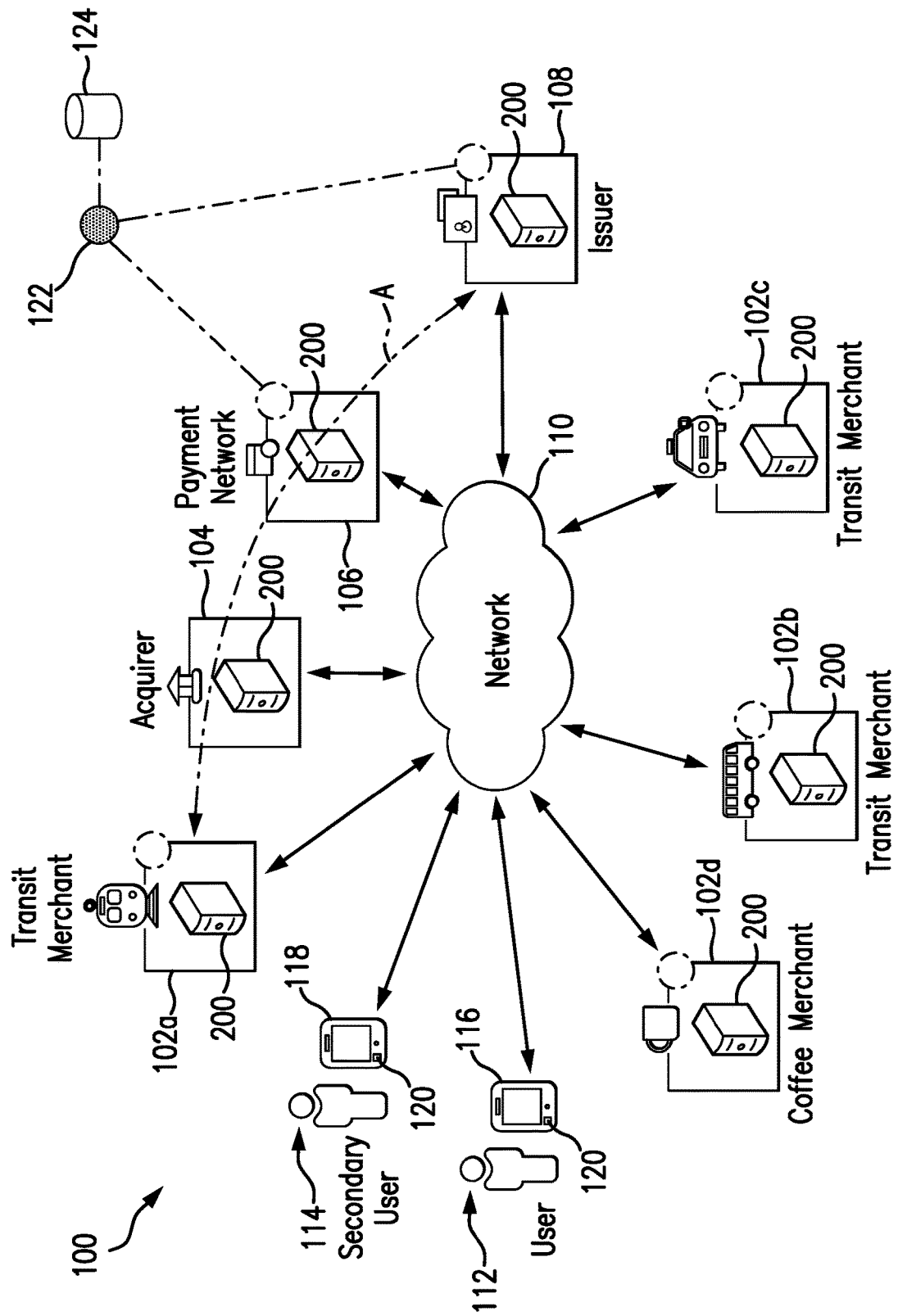
FIG. 1 is a block diagram of an exemplary system of the present disclosure suitable for use in facilitating the purchase of transit.

FIG. 1 illustrates an exemplary system 100, in which the one or more aspects of the present disclosure may be implemented. Although the system 100 is presented in one arrangement, other embodiments may include systems arranged otherwise depending, for example, on travel options, funding sources, notifications, categories of transit (or, broadly, categories of merchants), transit options, accessibility of transit data, accessibility of user data, online/offline processing of transactions, processing of purchase options for travel, involvement of non-transit merchants, etc. In addition, while the system 100 is generally described in connection with transit merchants, whereby funds are used to purchase travel, it should be appreciated that the present disclosure is not so limited and may be additionally, or alternatively, implemented in connection with any other types of merchants (including non-transit merchants, etc.).

The illustrated system 100 generally includes four merchants 102*a-d*, an acquirer 104 associated with accounts for each of the transit merchant 102*a-d*, a payment network 106, and an issuer 108, each coupled to network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which is accessible as desired to the merchants 102a-d, the acquirer 104, the payment network 106, the issuer 108, and a primary user 112.

The merchants 102a-c include transit merchants. Each of the transit merchants 102a-c is generally associated with travel services, and transport of persons from one location to another. In this exemplary embodiment, the transit merchant 102a is associated with train travel (e.g., travel by train, subway, tram, streetcar, trolley, metro, etc.) in one or more regions. The transit merchant 102b is associated with bus travel in one or more regions. And, the transit merchant 102c is associated with driver travel (e.g., travel by taxi, ride service (e.g., Uber™ service, Lyft™ service, etc.), etc.). In general, the transit merchants 102a-c offer transit to users, in exchange for a fee, charge, and/or fare. For example, the transit merchant 102a offers for sale and sells train passes, to users, per ride, for multiple rides, per duration (e.g., weekly pass, monthly pass, etc.), and/or for unlimited rides, etc. The train passes permit the purchasing users to travel in train(s) associated with the transit merchant 102a, as the train(s) travels from station to station. Similarly, for example, the transit merchant 102b offers for sale and sells bus passes to users, per ride (or multiple rides), per duration, or for unlimited rides, etc. Again, the passes permit the purchasing users to travel on buses associated with the transit merchant 102b, as each bus continues along its predefined route. And, the transit merchant 102c offers for sale and sells transit by individual vehicles (e.g., by cars, vans, trucks, luxury vehicles, etc.) to users, often per ride, which permits the purchasing users to travel, in the vehicles, from start locations to destinations, often directly.

The merchant 102d includes a coffee merchant. The coffee merchant 102d is generally associated with food and beverage services, and is configured to provide, for example, food and beverage products to consumers.

It should be appreciated that, while only four merchants 102a-d are shown in FIG. 1, a different number of merchants and/or different types of merchants may be included in other system embodiments. With regard to the transit merchants 102a-c, other types of transit provided by other transit merchants may include, for example, boat rides or ferry travel, charter services, etc. In addition, other types of merchants, other than transit merchants (e.g., coffee merchant 102d, etc.), may be included in certain embodiments (e.g., any merchant that accepts contact and/or contactless payment, etc.). Such other merchants may include, generally, for example, quick-serve dining merchants, etc.

In this exemplary embodiment, the system 100 includes the primary user 112 and also a secondary user 114 associated with the user 112. The association between the users 112 and 114 may include a variety of relationships such as, for example, familial relationships, guardianships, friendships, employment, etc. In one example, the user 112 is a parent or guardian, while the secondary user 114 is a minor child of the parent or the guardian. In a different example, the user 112 is an employer, while the secondary user 114 is an employee of the employer. In general, though, the user 112, either by obligation, voluntarily, or otherwise, provides funding for travel of the secondary user 114, from place to place, via one or more of the transit merchants 102a-d. It should be appreciated that the system 100 may include multiple secondary users, associated with the primary user 112 (or associated with other primary users) in other embodiments (i.e., the system 100 is not limited to one secondary user for each primary user, and vice versa).

The primary user 112 is associated with a payment account, which is issued by the issuer 108 to the user 112 for use in funding payment account transactions. In the embodiments herein, the payment account is the source of funds to be transferred and/or provided to the secondary user 114 for the purchase of various products from the merchants 102a-d (e.g., transit, beverages, food, etc.), whereby the funds are provided to the account associated with the secondary user 114. The accounts may include, for example, credit accounts, checking/debit accounts, prepaid accounts, or other suitable accounts, etc. consistent with the description herein. In this exemplary embodiment, however, the account associated with the secondary user 114 is a prepaid account.

In addition, each of the users 112 and 114 are associated with a communication device 116 and 118, respectively. In this exemplary embodiment, the communication devices 116 and 118 include portable communication devices, such as, for example, smartphones, tablets, laptops, etc. Each of the communication devices 116 and 118 includes a network-based application, which is referred to as a transaction client 120. And, the transaction client 120, at each of the communication devices 116 and 118, as described below, configures the respective one of the communication devices 116 and 118 to operate as described herein. The transaction client 120 may be a standalone application within the communication devices 116 and 118, or it may be incorporated into another network-based application such as, for example, a virtual wallet application (e.g., integrated into the virtual wallet application via a suitable software development kit (SDK), etc.), etc. What's more, it should be appreciated that the transaction client 120 may be configured differently for the primary user 112 and the secondary user 114. For example, the transaction client 120 may be enabled for administrative permissions, privileges and/or operations (e.g., relating to payment account credentials, etc.) for the primary user 112, while the transaction client 120 may be limited to more basic operations for the secondary user 114. That said, the permissions, privileges and/or operations of the transaction client 120 may be enabled based on the user presently accessing the transaction client (e.g., via login, etc.), and thus not based on the particular one of the communication devices 116 and 118 in which it is included.

While only one acquirer 104, one payment network 106, one issuer 108, two users 112 and 114, and two communication device 116 and 118 are illustrated in FIG. 1, it should be appreciated that a different number of these entities and devices (and their associated components) may be included in the system 100, or may be included as a part of systems in other embodiments, consistent with the present disclosure. In addition, while the transaction client 120 is illustrated as included with/at the communication devices 116 and 118, it should be appreciated that the transaction client 120 may be included with/at other devices associated with the users 112 and 114 (e.g., Internet of Things (IoT) devices including wearable devices, etc.) and/or such other devices may be in communication with the communication devices 116 and 118 and/or the transaction client 120 as appropriate and for purposes as described herein. In at least one embodiment, a wearable device is consistent with the communication device 118, such that it includes the transaction client 120 and/or is configured to operate as described herein.

Figure 2:
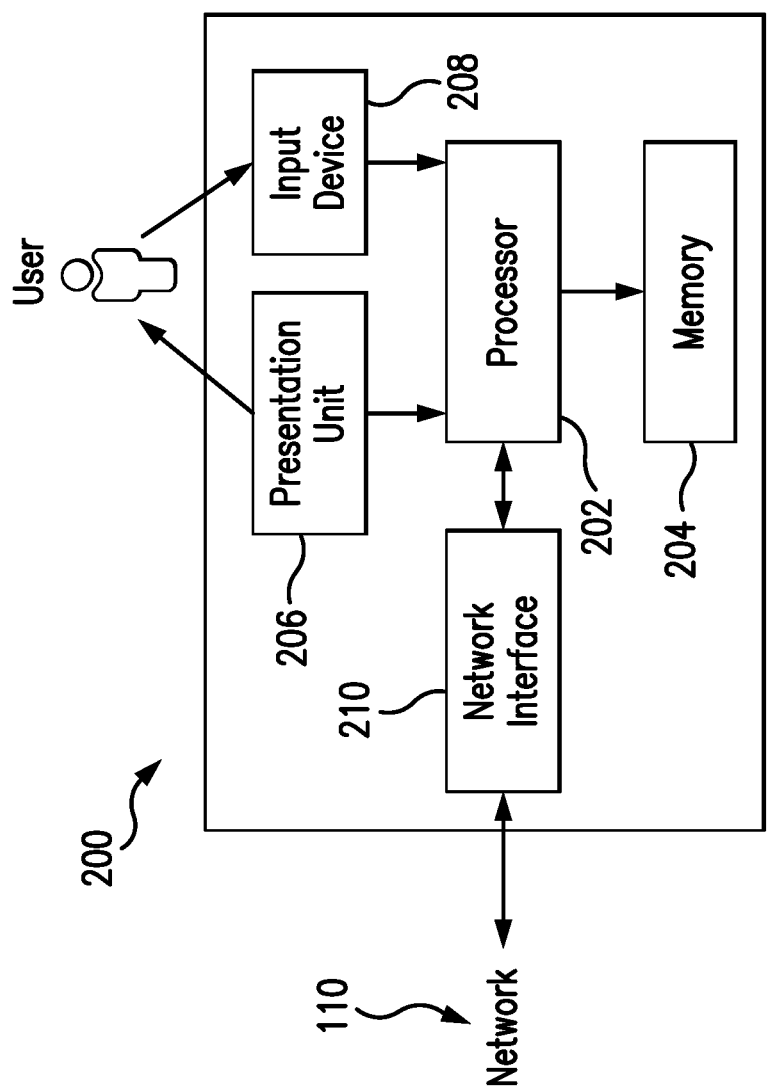
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein.

In the exemplary embodiment of FIG. 1, each of the merchants 102a-d, the acquirer 104, the payment network 106, and the issuer 108 are illustrated as including, or being implemented in, computing device 200, coupled to the network 110. For example, the computing devices 200 of the merchants 102a-d may include, without limitation, one or more point of sale (POS) terminals configured for processing payment devices in connection with purchase transactions for products (e.g., for travel passes, other products, etc.), where the POS devices are then consistent with computing device 200. In addition, each of the communication devices 116 and 118 associated with the users 112 and 114, respectively, may be considered computing devices consistent with computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to the processor 202. The processor 202 may include one or more processing units (e.g., in a multi-core configuration, etc.). For example, the processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, product data (e.g., transit data such as transit times, travel origins, travel destinations, transit routes, transit passes and related details, transit fares, etc.; other product data such as prices, product availability, descriptions, etc.), user locations, user profiles (e.g., user preferences, contact information, user associations, payment account information and credentials, etc.), and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. Such instructions often improve the efficiencies and/or performance of the processor 202 that is identifying and/or presenting purchase options to the user 112 and/or user 114. It should be appreciated that the memory 204 may include a variety of different memories, each implemented in one or more of the functions or processes described herein.

In the exemplary embodiment, the computing device 200 includes a presentation unit 206 that is coupled to the processor 202 (however, it should be appreciated that the computing device 200 could include output devices other than the presentation unit 206, etc.). The presentation unit 206 outputs information (e.g., purchase options for products, user updates (e.g., location updates, etc.), confirmations, etc.), either visually or audibly to a user of the computing device 200, for example, the user 112 or the user 114, etc. It should be further appreciated that various interfaces (as described herein) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, selections of products, selections of associated users, instructions to fund transit accounts, entries of payment information, etc. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to the processor 202 and the memory 204. The network interface 210 may include, without limitation, a wired network adapter, a wireless network adapter, a mobile network adapter (e.g., an NFC adapter, a Bluetooth adapter, etc.), or other device capable of communicating to one or more different networks, including the network 110. Further, in some exemplary embodiments, the computing device 200 includes the processor 202 and one or more network interfaces incorporated into or with the processor 202. Further, in various embodiments, the input device 208 and/or the network interface 210 of the computing device 200 may be incorporated, at least in part, as among other things, a GPS antenna suitable to capture GPS signals for processing by the processor 202 to determine a location of the computing device 200.

Referring again to FIG. 1, the system 100 further includes a purchase platform 122, which is configured, by executable instructions, generally, to interact with the transaction client 120 (e.g., at the communication devices 116 and 118, etc.) and to otherwise operate as described herein. The purchase platform 122 is shown in FIG. 1 as a standalone part of the system 100, and is generally consistent with computing device 200 (e.g., with or without the presentation unit 206 and/or the input device 208, etc.) (e.g., a platform computing device, etc.). Alternatively, and as indicated by the dotted lines and circles in FIG. 1, the purchase platform 122 may be incorporated, in whole or in part, into the one or more of the merchants 102a-d, the payment network, and/or the issuer 108. In addition, the purchase platform 122 is coupled to a data structure 124, which may be standalone from the purchase platform 122 or, as indicated by the dotted line, may be incorporated in whole, or in part, with the purchase platform 122. The data structure 124 includes user profiles, data relating to products (e.g., transit passes, fees, fares, etc.; other product costs; product availability; etc.) for the merchants 102*a-d*, transit schedules and/or routes for the transit merchants 102*a-c*, menus and/or product available for the coffee merchant 102*d*, etc.

While numerous operations and/or configurations herein are described with reference to either the purchase platform 122 or the transaction client 120, this should not be understood to limit the operations and/or configurations to being associated with the particular one of the purchase platform 122 and the transaction client 120. In various embodiments, for example, one or more operations and/or configurations may be included in the purchase platform 122 and/or the transaction client 120 based on efficiency, security, and/or ease of implementation, etc. It should further be appreciated that one or more services associated with the payment network 106, for example, may be integrated and/or incorporated via the purchase platform 122 and/or the transaction client 120, whereby the same utilizes, for example, MasterCard Send™, M/Chip Prepaid, MasterPass™ API, MasterPass™ QR, InControl™ API, Mobile Payments SDK, Location Services API, etc., to provide one or more of the operations described herein.

In use of the system 100, initially, the primary user 112 adds the transaction client 120 to the communication device 116 and activates the transaction client 120. In turn, the communication device 116 is configured, by the transaction client 120, to solicit information from the user 112 and to compile a user profile for the user 112. The information may include a name of the user 112, an address of the user 112, a phone number for the user 112, etc., and also payment account information and credentials for the user's payment account. Once the user profile is compiled, or prior, the communication device 116 is configured to solicit one or more identifiers for one or more associated secondary users, such as, for example, the secondary user 114. The identifier may include, for example, an email address for the secondary user 114, a phone number for the secondary user 114, an application ID, or other identifier unique to the secondary user 114. In one example, the communication device 116 is configured, by the transaction client 120, to transmit an invitation (e.g., including a URL associated with the purchase platform 122, etc.) to the secondary user 114, at the communication device 118, upon receipt of the identifier (e.g., an email, an SMS message, etc. via the unique URL; etc.). In response, the secondary user 114 may select the invitation and likewise add the transaction client 120 to the communication device 118, thereby linking (e.g., based on the selection of the URL, etc.) the transaction client 120 in the communication device 118 to the account of the primary user 112. Thereafter, the communication device 118 may be configured, by the transaction client 120, to solicit information from the secondary user 114 and to compile a user profile for the secondary user 114. Additionally, or alternatively, the communication device 116 associated with the primary user 112 may be configured, by the transaction client 120, to compile the user profile for the secondary user 114 (in response to inputs from the primary user 112), in whole or in part, before transmitting the invitation thereto. Regardless, the profile associated with the secondary user 114 may include various information for the secondary user 114 such as name, address, predefined destinations (e.g., specific locations to which the secondary user 114 is allowed to travel using the transaction client 120, etc. as identified by the user 112 and/or the user 114; etc.), rules and/or restrictions on product purchases (e.g., specific products that can/cannot be purchased, specific travel for purchase, etc.), approved merchants (e.g., approved ones of the merchants 102*a-d*, etc.), etc. In connection therewith, the primary user 112 may register (e.g., approve, etc.) various products, merchants, product options, etc., through the user profile, for which the secondary user 114 may spend funds from his/her payment account (as transferred thereto by the primary user 112).

When the user 112 creates the user profile for the secondary user 114, or after the profile is compiled by the secondary user 114, the primary user 112 may include in the user profile one or more parameters relating to spending limits and/or purchase category limits. For example, the user 112 may impose a $5 limit at coffee merchant 102*d*, and/or a category parameter limiting transactions to transit merchants such as transit merchants 102*a-c*. In this manner, the user 112 may be able to control use of the funds in the account associated with the secondary user 114 for purchases intended or otherwise permitted by the user 112, etc.

Once the user profiles are compiled for the users 112 and 114, the communication devices 116 and 118 are each configured, by the transaction client 120, to transmit the user profiles, in whole or in part, to the purchase platform 122, which is configured to then store the user profiles in the data structure 124, whereupon the users 112 and 114 are registered (e.g., are registered to the purchase platform 122, etc.).

Then in the system 100, according to the above or otherwise, the primary user 112 seeks to load funds to a payment account associated with the secondary user 114 (e.g., a prepaid payment account issued by the issuer 108, or a payment account issued by another issuer (different from the issuer 108 that issued the payment account to the primary user 112), etc.). Specifically, in this embodiment, the user 112 selects an option to add funds, via the communication device 116 (through the transaction client 120), which, in turn, is configured, by the transaction client 120, to solicit an amount to add and, potentially, a comment and/or designation for the funds (e.g., such that the funds are to be used by the secondary user 114 for specific transactions, etc.). In turn, the communication device 116 is configured, by the transaction client 120, to recognize the request to add funds by the primary user 112 and to cooperate with the purchase platform 122 to retrieve payment account credential from the user profile of the user 112. And once retrieved, the communication device 116 is configured, via the transaction client 120, to generate an authorization request for a transaction between the payment account of the primary user 112 and the payment account of the secondary user 114, whereby upon approval of the authorization request by the issuer 108 (associated with the primary user's payment account), appropriate funds are transferred to the secondary user's payment account.

When the desired funds are included in (or added to) the payment account of the secondary user 114, the secondary user 114 is permitted to purchase products (e.g., transit, food, beverages, other products, etc.) via the communication device 116, as desired and/or as allowed (e.g., subject to any restriction parameters included in the user profile for the secondary user 114 (e.g., as provided by the primary user 112, etc.), etc.). In particular, for example, when the secondary user 114 is attempting to travel to school from a current location, or return home from school, the user 114 accesses the transaction client 120 at the communication device 118 and requests desired travel. In response, the communication device 118 is configured, by the transaction client 120, to offer the user 114 the option of travel via one or more of the transit merchants 102*a-c*. When the user 114 selects the transit merchant 102*a*, for example, the communication device 118 is configured to transmit a purchase request for a train pass (consistent with the user's preferences in the user profile for the secondary user 114 and/or as specified), along with payment account credentials associated with the user's payment account.

In turn, the transit merchant 102a is configured to communicate an authorization request for the transaction to the acquirer 104 identifying, for example, a payment account number for the transaction and an amount of the purchase, along path A shown in FIG. 1. The acquirer 104, in turn, is configured to communicate the authorization request to the issuer 108, through the payment network 106, such as, for example, through MasterCard®, VISA®, Discover®, American Express®, etc., to determine whether the payment account of the user 114 is in good standing and whether there is sufficient credit or funds to complete the transaction. If the issuer 108 accepts the transaction, a reply authorizing the transaction is provided back to the acquirer 104 and the transit merchant 102a, thereby permitting the transit merchant 102a to complete the transaction. Thereafter, the transit merchant 102a is configured to issue a train pass to the user 114, at the communication device 118, which, in turn, is configured, by the transaction client 120, to display the train pass at the communication device 118 (e.g., via presentation unit 206, etc.) to be received and/or scanned by the transit merchant 102a for entry to the train (or station) associated therewith (e.g., the train pass may be displayed at the communication device 118 via a scan code or other computer-readable indicia, etc.).

Conversely, in another example, the user 114 may select transit from the transit merchant 102c, in which case the communication device 118 is configured, by the transaction client 120, to display a symbol or other computer-readable indicia associated with the payment account of the secondary user 114 at the communication device 118 (e.g., at the presentation unit 206, etc.). In response, a driver associated with the transit merchant 102c scans, via a POS terminal, the indicia at the communication device 118, thereby capturing payment account credentials associated with the user's payment account. In turn, like above, the transit merchant 102c is configured to communicate an authorization request to the acquirer 104 identifying, for example, a payment account number for the transaction and an amount of the purchase. The acquirer 104, again, is configured to then communicate the authorization request to the issuer 108, through the payment network 106, to determine whether the payment account of the secondary user 114 is in good standing and whether there is sufficient credit or funds to complete the transaction. If the issuer 108 accepts the transaction, a reply authorizing the transaction is provided back to the acquirer 104 and the transit merchant 102c, thereby permitting the transit merchant 102c to complete the transaction. Thereafter, the transit merchant 102c conveys the secondary user 114 to the destination of travel (e.g., school, home, etc.).

Further, in still another example, the user 114 may select a product from the coffee merchant 102d (e.g., a food product, etc.), in which case the communication device 118 is configured, by the transaction client 120, to display a symbol or other computer-readable indicia associated with the payment account of the secondary user 114 at the communication device 118 (e.g., at the presentation unit 206, etc.). In response, an employee associated with the merchant 102d scans, via a POS terminal, the indicia at the communication device 118, thereby capturing payment account credentials associated with the user's payment account. In turn, like above, the merchant 102d is configured to communicate an authorization request to the acquirer 104 identifying, for example, a payment account number for the transaction and an amount of the purchase. The acquirer 104, again, is configured to then communicate the authorization request to the issuer 108 (associated with the secondary user's payment account), through the payment network 106, to determine whether the payment account of the secondary user 114 is in good standing and whether there is sufficient credit or funds to complete the transaction. If the issuer 108 accepts the transaction, a reply authorizing the transaction is provided back to the acquirer 104 and the merchant 102d, thereby permitting the merchant 102d to complete the transaction. Thereafter, the merchant 102d delivers the desired product to the secondary user 114.

While in the above examples the transaction client 120 and the purchase platform 122 are described with reference to the transit merchants 102a and 102c and the coffee merchant 102d, it should be appreciated that interactions and transactions with the transit merchant 102b and with any other appropriate merchant would be substantially similar.

In addition, the communication device 118 associated with the secondary user 114 is configured, by the transaction client 120, to report the performed transactions to the purchase platform 122, along with location information and/or times associated therewith. In one example, the communication device 118 is configured, by the transaction client 120, to transmit a user event to the purchase platform 122 whenever a payment account credential is displayed at the communication device 118, or whenever a transit pass, for example, is displayed at the communication device 118 and/or scanned by one of the transit merchants 102a and 102b, or whenever the user 114 arrives or leaves a known location (e.g., when the user 114 arrives home, etc.) based on GPS data, etc.

In connection therewith, when a user event is received by the purchase platform 122 for the secondary user 114 (from the communication device 118), the communication device 116 is configured, by the transaction client 120, to receive the user event from the purchase platform 122 and to display the user event to the user 112 (via the presentation unit 206). The communication device 116, via the transaction client 120, may also be configured to display additional details for the user event, for example, in response to a selection of the event (e.g., specific products purchased, specific travel times, a specific travel route, a cost associated with the purchase, etc.). The primary user 112, therefore, is permitted to review and/or monitor not only use of the payment account by the user 114 to purchase products, but also details of the purchased products and the location of the user 114 relative to the purchases, via the transaction client 120.

As part of the above interactions among the merchants 102a-d, the acquirer 104, the payment network 106, the issuer 108, the transaction client 120, and the purchase platform 122, transaction data is generated, collected, and stored. The transaction data represents at least a plurality of transactions, e.g., completed transactions, attempted transactions, etc. The transaction data, in this exemplary embodiment, is stored in the data structure 124, for example, and/or in a data structure associated with the payment network 106, etc. The transaction data includes, for example, payment account numbers, amounts of the transactions, merchant IDs, merchant category codes (MCCs), dates/times of the transactions, products purchased and related descriptions or identifiers, etc. It should be appreciated that more or less information related to transactions, as part of either authorization and/or clearing and/or settling, may be included in transaction data and stored within the system 100, at the transit merchants 102a-c, the acquirer 104, the payment network 106, and/or the issuer 108. In addition to transaction data, other data associated with the transactions and/or the transaction clients 120 may be generated, collected, and stored in the data structure 124, for example, and/or a data structure associated with the payment network 106, etc. Such other data may include, without limitation, location data, time/date data, and transit data, product data, etc.

In various exemplary embodiments, the users herein when applying for the different accounts herein (e.g., the different payment accounts, etc.) and/or during registration (e.g., during transaction client registration, etc.) are prompted to agree to legal terms associated with their accounts and/or with their registration. In so doing, the users may voluntarily agree, for example, to allow merchants, issuers, payment networks, etc., to use transaction data and other data obtained thereby for one or more of the different purposes described herein. That said, there may be some data that will not be shared even if a user does consent, for example, when it is against policy or otherwise inappropriate. The user may be afforded many options but some may be restricted for legal or policy reasons or the like (yet, appropriate age limits are preferably enforced on those registering/enrolling). That is, there is preferably no sharing of information without the user's consent, and some data may not be appropriate to share even with the user's consent. And, appropriate usage limits are preferably placed on use of the publication, dissemination, and/or sharing of the data. Of course, all applicable laws, rules, regulations, policies and procedures with respect to age of users, privacy, and the like will always be fully complied with.

FIG. 3 illustrates an exemplary method 300 for facilitating purchase of a product and, in particular, for facilitating use of funds by a secondary user to purchase the product. The exemplary method 300 is described as implemented in the transaction client 120 and the purchase platform 122, and with further reference to the users 112 and 114, the communication devices 116 and 118, the transit merchant 102a, and also the computing device 200. However, it should be understood that the methods herein are not limited to the exemplary system 100 or the exemplary computing device 200. Likewise, the systems and the computing devices herein should not be understood to be limited to the exemplary method 300. Further, the method 300 is described with reference to exemplary interfaces 400-404 included in FIGS. 4A-C. However, the exemplary interfaces 400-404 are provided for purposes of illustration, and thus, should not be understood to the limit the present disclosure (as other interfaces with other content and/or format may be used in other embodiments). It should also be understood that while the method 300 is described in connection with purchase of a transit product by the secondary user 114 from the transit merchant 102a, the method 300 is also applicable to transactions by the secondary user 114 at other merchants (e.g., other transit merchants, other merchants in general, etc.).

At the outset in the method 300, each of the primary user 112 and the secondary user 114 is registered to one or more accounts associated with the purchase platform 122, as described above. In addition, each of the users 112 and 114 have the transaction client 120 installed to their corresponding communication device 116 and 118.

As shown in FIG. 3, at 302, when the secondary user 114 desires to travel from one location to another, for example, the secondary user 114 accesses the transaction client 120, at the communication device 118. In turn, the transaction client 120 accesses, at 304, the profile of the user 114, located either internal to the communication device 118 (e.g., in memory 204, etc.) or at the data structure 124 (where such access is via the purchase platform 122).

In accessing the profile, the transaction client 120 and/or the purchase platform 122 retrieves from the secondary user's profile predefined destinations for the user 114 (e.g., generally from the profile (such that all predefined destinations are retrieved), or based on a current location of the communication device 116 (with only predefined destinations near the current location retrieved), based on a time of day, based on a day of the week, based on a day of the month, based on rules imposed by the users 112 and/or 114, etc.), and also a listing of the transit merchants 102a-c available to provide transit for such predefined destinations. As indicated above in the system 100, the predefined destinations generally include a listing of destinations to which the secondary user 114 is allowed to travel through use of the transit merchant 120 (e.g., as provided by the primary user 112, as provided by the secondary user 114, etc.). In addition, the payment account information and credentials for the payment account associated with the user 114 (for use in funding any selected travel to one or more of the predefined destinations) are further accessed from the user's profile, again, as either stored within the communication device 118 (e.g., in memory 204, etc.) or at the data structure 124. Typically, when this information is stored at the data structure 124, it will be available to the communication device 118 as needed (e.g., upon login, etc.). In connection therewith, the payment account information may be tokenized and/or provisioned by the payment network 106 (e.g., via MasterCard Digital Enablement Service (MDES), etc.) and/or accessible via the network 110 (e.g., via MasterCard Cloud-Based Payment (MCBP) technology, etc.).

Next, at 306, the transaction client 120 displays, at the communication device 118 (via the presentation unit 206), available destinations for travel for the secondary user 114 (e.g., the transaction client 120 displays the available predefined destinations for the user 114, etc.). Broadly, the transaction client 120 displays available products to the secondary user 114, subject to any parameters included in the user profile for the secondary user 114 (e.g., parental controls, preselected locations by guardians, common locations, scheduled locations, preferred/approved locations, etc.), etc. In response, the user 114 selects, at 308, one of the available destinations (e.g., a transit option for "home," etc.). Then, at 310, the transaction client 120 receives the selection and displays transit options (or travel options) to allow the user 112 to travel to the selected one of the available destinations, for example, as available from transit merchants 102a-c (e.g., where the transit merchant information (e.g., schedule, fares, maps) is accessed by the transaction client 120 through application program interfaces (APIs) with the merchants 102a-c, etc.). The transit options may be based on travel by the user 114 from a current location (as determined by GPS data from the communication device 118 so that nearby transit options may be identified) to the selected one of the available destinations. Or, the transit options may be based on predetermined transportation categories (e.g., train, bus, ride services, ferry, etc.), with the secondary user 114 then able to select a desired option.

Figure 4C:
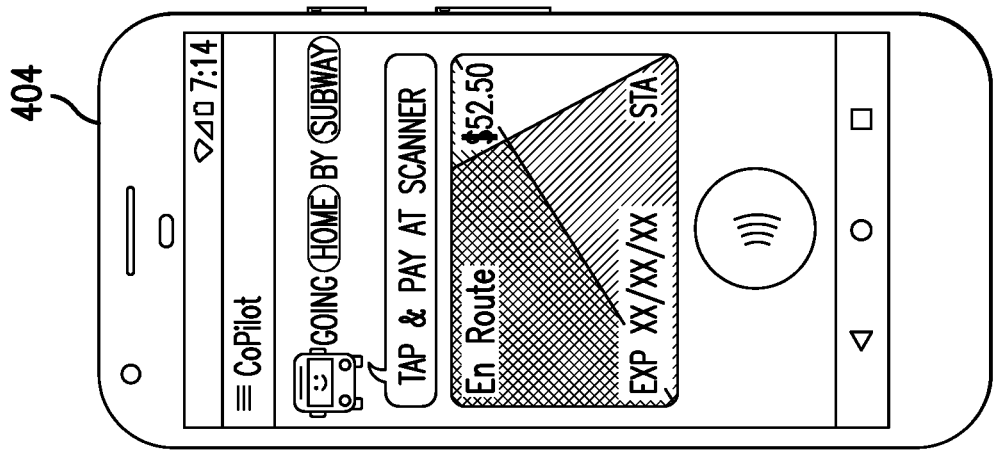
FIGS. 4A-4C are exemplary interfaces, which may be displayed to a user, in connection with the system of FIG. 1 and/or the method of FIG. 3, for use in purchasing transit.
Figure 4B:
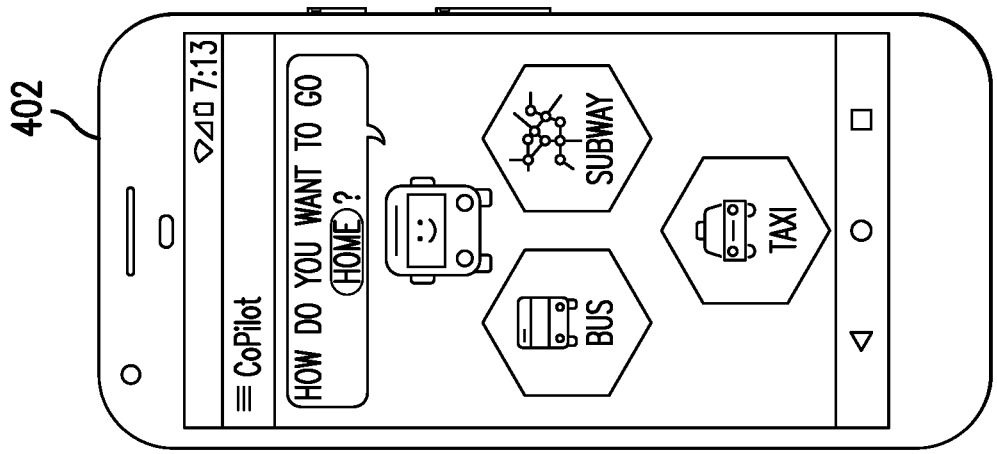
Figure 4A:
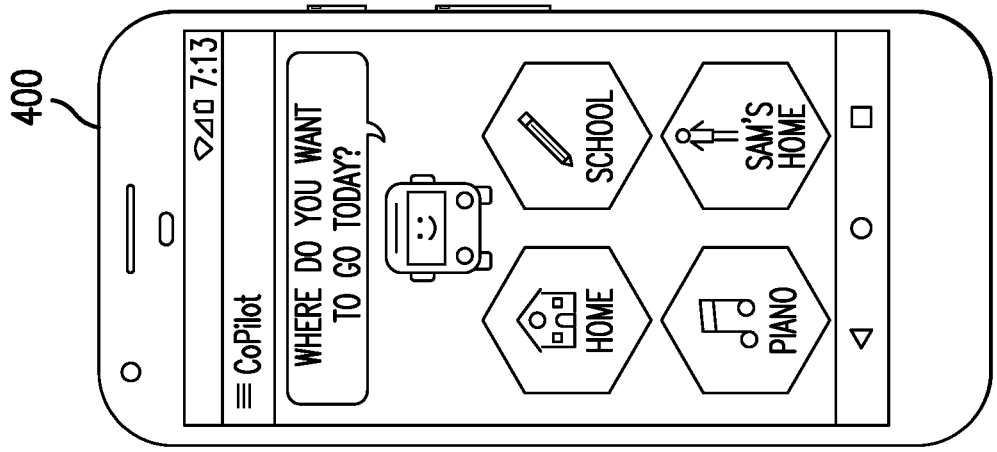

FIG. 4A illustrates an exemplary interface 400 that may be displayed to the secondary user 114 at the presentation unit 206 of the communication device 118 for use in soliciting a selection from the user 114 of a destination for travel (from a listing of available predefined destinations). Specifically, in this example, the interface 400 includes four available predefined travel destinations for the secondary user 114: "Home," "School," "Piano," and "Sam's Home." It should be appreciated that other destinations may be included, as part of the profile associated with the user 114, and provided to the user 114 as part of the listing of available travel destinations in other examples (e.g., depending on the number of predefined destinations included in the profile, depending on the user's current location, depending on a time of day or day of week, etc.).

In turn in the method 300, the secondary user 114 selects, at 312, one of the transit options (as provided by the transaction client 120) to travel to the selected one of the available destinations. In this example, the secondary user 114 selects a transit option associated with the transit merchant 102a (i.e., the train transit merchant). The transaction client 120 receives the selection from the user 114, at 314, and displays, at the communication device 118, a payment account credential for the payment account associated with the user 114 (as retrieved from the profile for the user 114, accessed at 304) as a computer-readable indicia (e.g., a barcode, a QR code, an alpha-numeric, etc.), at 316. In so doing, the secondary user 114 is able to present the computer-readable indicia to the transit merchant 102a (via the communication device 118), and the transit merchant 102a can scan or otherwise read the payment account credentials and facilitate a payment account transaction for the transit, as described above in the system 100.

Alternatively, upon receiving the selection from the user 114 of the desired transit option, at 314, rather than displaying the payment account credentials, the transaction client 120, via the communication device 118, may instead emit the payment account credentials as a wireless signal, such as, for example, a radio-frequency (RF) signal, a near field communication (NFC) signal, a Bluetooth signal, a ZigBee signal, etc., which is suitable to be received and/or detected by a POS computing device at the transit merchant 102a. The transit merchant 102a can then facilitate a payment account transaction for the transit, as described above in the system 100.

FIG. 4B illustrates an exemplary interface 402 that may be displayed to the secondary user 114 at the presentation unit 206 of the communication device 118 for use in soliciting a selection from the user 114 of a transit option to travel to the destination selected at the interface 400 of FIG. 4A. For purposes of illustration, the secondary user 114 may select the destination "Home" at the interface 400. In response, the transaction client 120 receives the selection and displays options for the secondary user 114 to travel home. Specifically, in this example, the interface 402 includes three available predefined transit options for the secondary user 114: "Bus," "Subway," and "Taxi." And, FIG. 4C illustrates an exemplary interface 404 that may be displayed to the secondary user 114 at the presentation unit 206 of the communication device 118 upon selection of the "Subway" transit option in the interface 402. As shown, in the interface 404, payment account credentials for the payment account of the secondary user 114 are available and ready to be presented to a transit merchant associated with the "Subway" transit option (e.g., transit merchant 102a, etc.), for example, emitted for contactless transmission upon a tap of the communication device 118 to a POS terminal of the transit merchant, etc. As also shown in the interface 404, the secondary user 114 has $52.50 in funds available for use. After receipt of the payment account credentials, the transit merchant then initiates a payment account transaction consistent with the description above.

Further in the method 300, the transaction client 120 and/or the purchase platform 122 may, optionally (as indicated by the dotted lines in FIG. 3), cause, at 318, a payment account transaction to be initiated for a transit pass from the selected transit merchant 102a using the payment account credentials for the user 114 (again, as retrieved from the profile for the user 114, accessed at 304). The payment account transaction is directed to the transit merchant 102a, for example, via the network 110, which causes the transit merchant 102a to generate an authorization request for the transaction consistent with the above description in the system 100, and transmit the authorization request to the issuer 108, via the payment network 106. If the transaction is approved, the transit merchant 102a responds with the pass, or at least an identifier associated with the pass. And, in turn, at 320, the transaction client 120 displays (and/or the purchase platform 122 causes to be displayed (broadly, displays)) the pass at the communication device 118 in a manner usable by the secondary user 114 at the transit merchant 102a (e.g., as computer-readable indicia, etc.).

Again, while the method 300 is described with reference to the transit merchant 102a, it should be appreciated that the method 300 would be substantially similar to, and similarly applies to, purchases of transit by the secondary user 114 from either of the transit merchants 102b-c, or other transit merchants. It should also be appreciated that the method 300 is not limited to transit merchants, and similarly applies to the coffee merchant 102d and/or other available merchants.

In various implementations of the method 300, the transaction client 120 and/or the purchase platform 122 may append the various user events performed by the primary user 112 and/or the secondary user 114, for example, in event logs, etc. In connection therewith, inputs to the interfaces 400-404 may be identified as user events, inputs of personal preferences for the secondary user 114 may be identified as user events, transactions made by the secondary user 114 may be identified as user events, etc.

Figure 5:
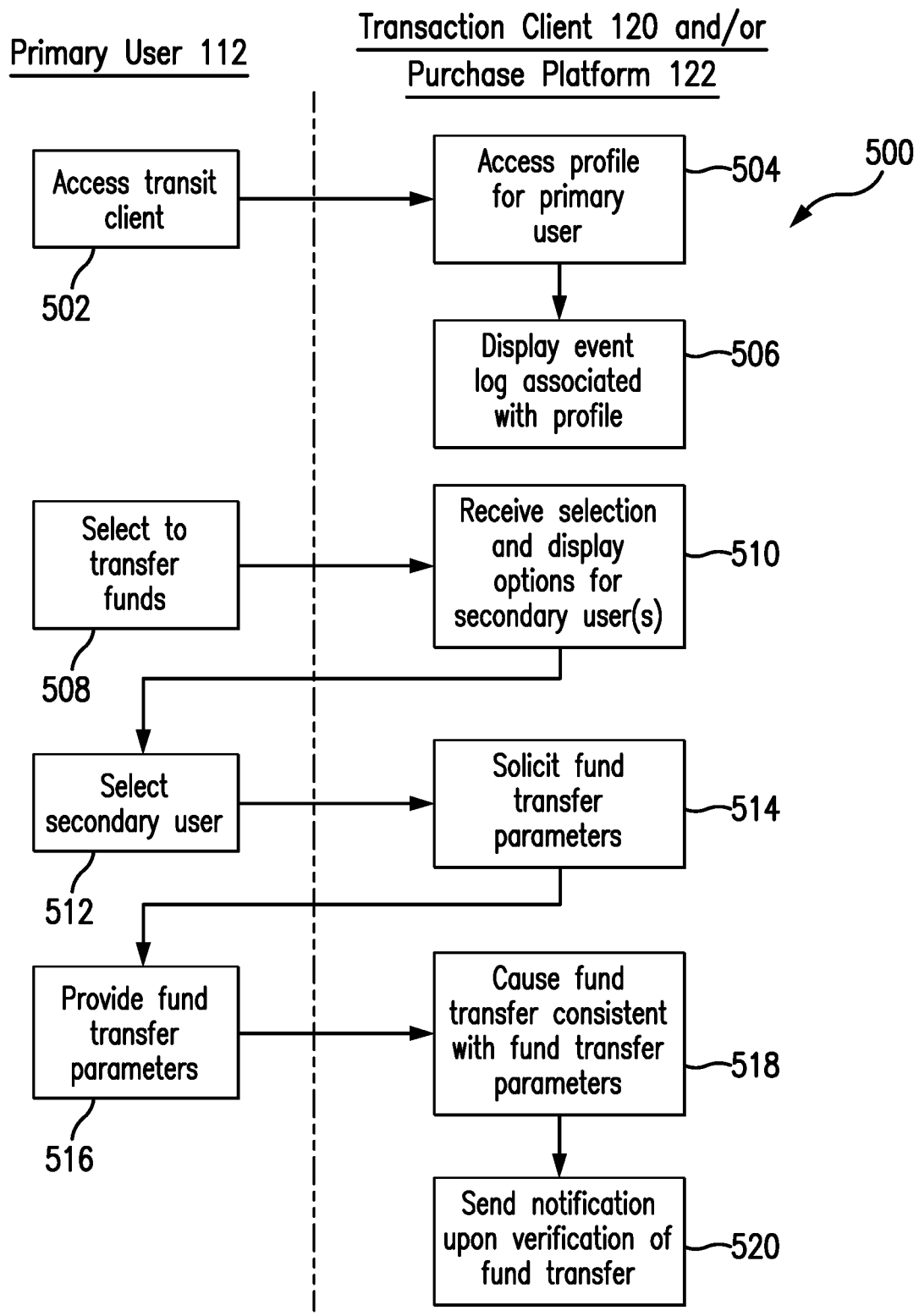
FIG. 5 is an exemplary method for monitoring and/or facilitating the purchase of transit, and which may be implemented in the system of FIG. 1.

FIG. 5 illustrates an exemplary method 500 for monitoring purchases of products, and for loading funds to an account for use by a secondary user to facilitate such purchases. The exemplary method 500 is described as implemented in the transaction client 120 and the purchase platform 122, and with further reference to the users 112 and 114, the communication devices 116 and 118, and also the computing device 200. However, it should be understood that the methods herein are not limited to the exemplary system 100 or the exemplary computing device 200. Likewise, the systems and the computing devices herein should not be understood to be limited to the exemplary method 500. Further, the method 500 is described with reference to exemplary interfaces 600, 700-704, and 800 included in FIGS. 6-8. However, the exemplary interfaces 600, 700-704, and 800 are provided for purposes of illustration, and thus, should not be understood to the limit the present disclosure (as other interfaces with other content and/or format may be used in other embodiments). It should also be understood that while the method 500 is described in connection with purchase of a transit product by the secondary user 114 from the transit merchant 102a, the method 300 is also applicable to transactions by the secondary user 114 at other merchants (e.g., other transit merchants, other merchants in general, etc.).

At the outset in the method 500, again, each of the primary user 112 and the secondary user 114 is registered to one or more accounts associated with the purchase platform 122, as described above. In addition, each of the users 112 and 114 have the transaction client 120 installed to their corresponding communication device 116 and 118.

At 502 in the method 500, when the primary user desires to monitor transit of the secondary user 114 (and/or other activity of the secondary user 114 as gleaned from the users transactions) and/or add funds to the payment account of the secondary user 114, the primary user 112 accesses the transaction client 120, at the communication device 116. In turn, the transaction client 120 and/or the purchase platform 122 to access, at 504, the profile of the user 112, located either internal to the communication device 118 (e.g., in memory 204, etc.) or at the data structure 124 (where such access is via the purchase platform 122). In accessing the profile, the transaction client 120 and/or the purchase platform 122 retrieves from the profile the name of the user 112, the name of the secondary user 114, event logs for the user 112 and/or secondary user 114, etc. In addition, the transaction client 120 and/or the purchase platform 122 accesses from the profile payment account information and credentials for the primary user 112 (as either stored within the communication device 118 (e.g., in memory 204, etc.) or at the data structure 124). As indicated above, this information will typically be stored at the data structure 124 and then be available to the communication device 118 as needed (e.g., based on secure login access to the data structure 124 and/or purchase platform 122, etc.).

At 506, after accessing the profile for the primary user 112, the transaction client 120 and/or the purchase platform 122 displays or causes to be displayed (broadly, displays), an event log associated with the profile of the primary user 112. The event log includes a listing of different user events associated with the secondary user 114, for example arrival of the secondary user 114 at a particular destination, a transaction by the secondary user 114 for a product, etc. The events are included in the event log based on a predefined relation between the primary user 112 and the secondary user 114 (e.g., as established during registration by the users 112 and 114 with the purchase platform 122, etc.). And, by presenting the event log to the primary user 112, the user 112 is able to monitor the activity of the secondary user 114, and also track the location of the secondary user 114 as desired.

Figure 6:
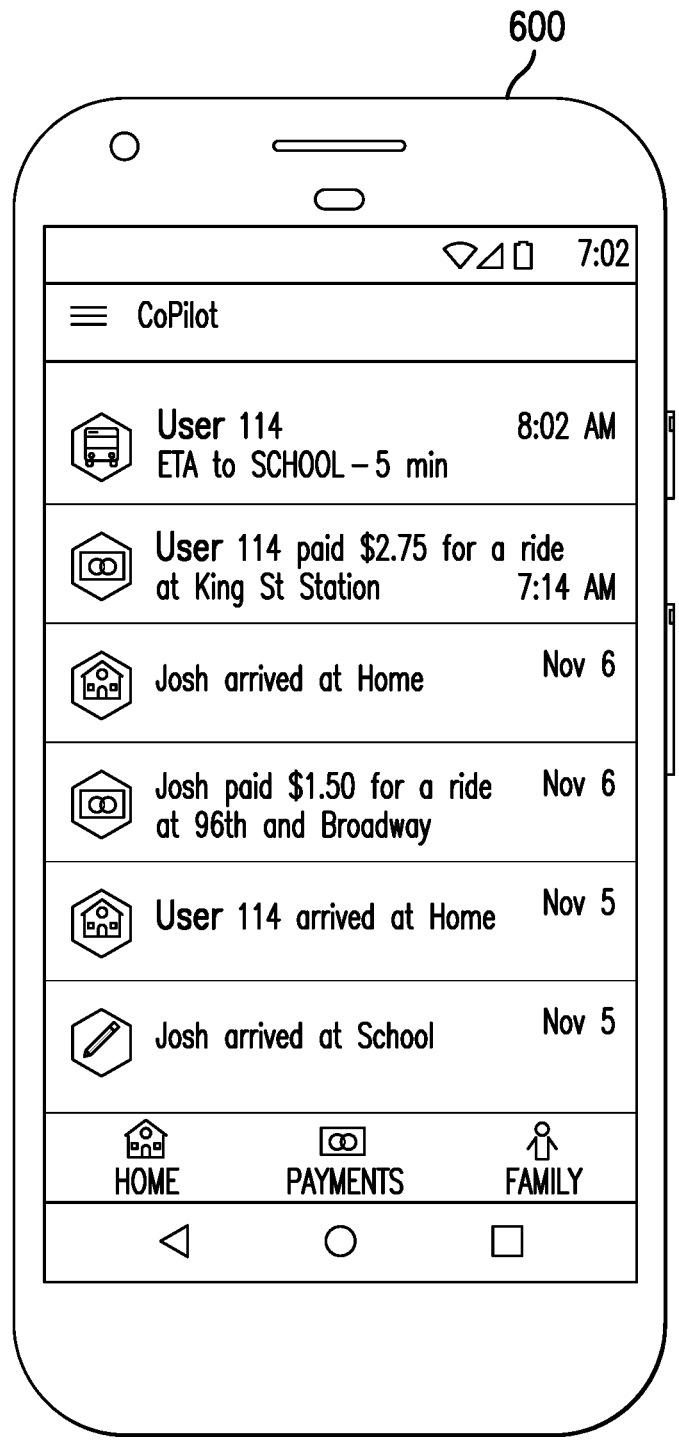
FIGS. 6-8 are exemplary interfaces, which may be displayed to a user in connection with the system of FIG. 1 and/or the method of FIG. 5, for use in facilitating the purchase of transit.

FIG. 6 illustrates an exemplary interface 600, which includes an event log that may be associated with the primary user 112 (and displayed to the primary user 112 at the communication device 116). In the exemplary interface 600, the event log includes a listing of events associated with each of the secondary users for the user 112, including, in this example, the secondary user 114 and another secondary user named "Josh." For example, one event is generated (and stored, for example, at the data structure 124) for the secondary user 114 when the secondary user 114 arrived at Home, and another event is generated (and stored, for example, at the data structure 124) for the secondary user 114 when the secondary user 114 purchased transit for $2.75 for a ride at King St. Station.

Separately in the method 500, as the secondary user 114 spends the funds in his/her payment account to purchase products, the funds will eventually become depleted. As such, from time to time, or based on some other occurrence, the primary user 112 may desire to transfer funds to the payment account associated with the secondary user 114. To do so, the primary user 112 selects, at 508, to transfer funds to the payment account. In turn, at 510, the transaction client 120 receives the selection and displays a listing of available secondary users to whom funds may be transferred. In response, the primary user 112 selects, at 512, one of the secondary users, for example, the secondary user 114. The transaction client 120 and/or purchase platform 122, thereafter, solicits, at 514, fund transfer parameters, such as, for example, amount, source account, spending controls, comments, etc. The user 112 then provides, at 516, the fund transfer parameters to the transaction client 120, via the communication device 116.

Figure 7C:
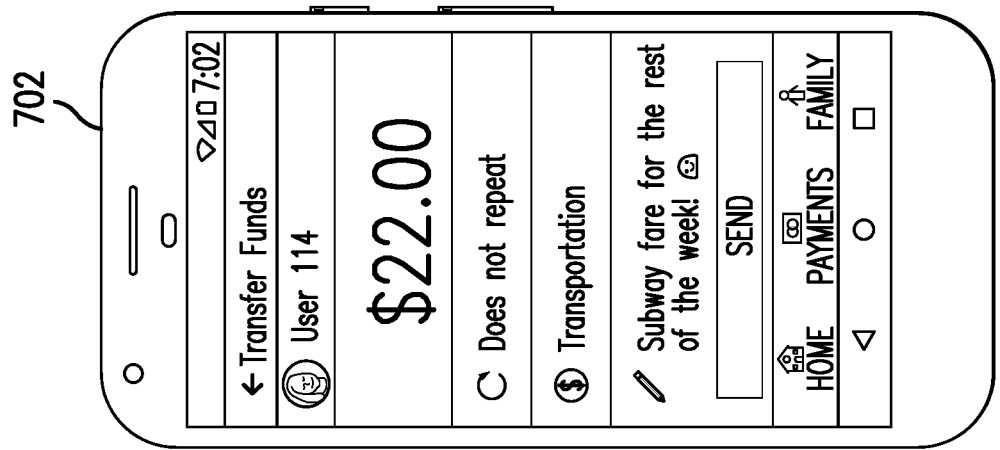
Figure 7B:
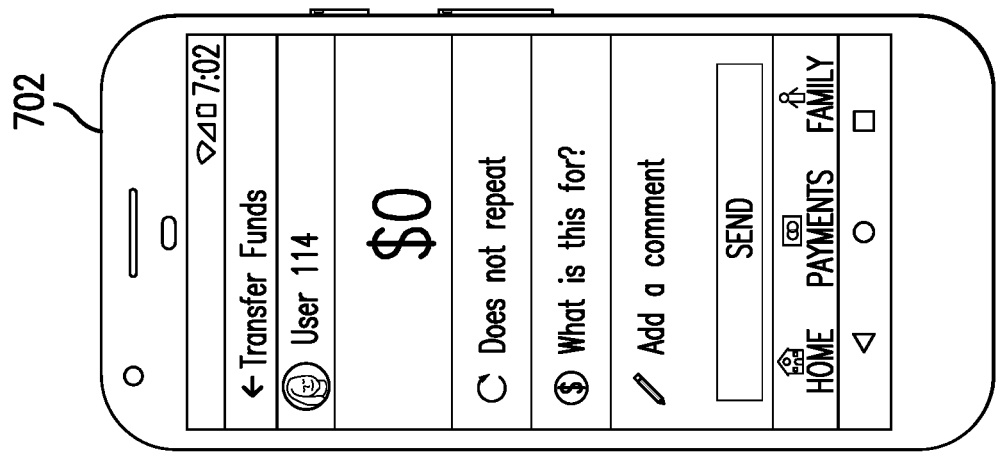
Figure 7A:
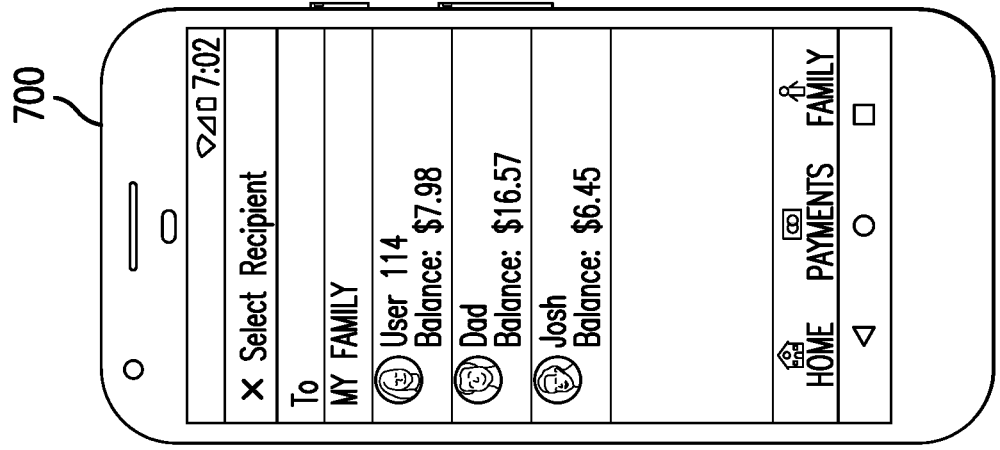

For example, with reference to the interface 600 of FIG. 6, the primary user 112 may select the "Payments" tab at the bottom of interface 600 to initiate a transfer of funds to a desired secondary user. FIG. 7A illustrates an exemplary interface 700 that may be displayed to the primary user 112 at the communication device 118 upon selection of the "Payments" tab at interface 600. As shown, the interface 700 includes a list of secondary users associated with the primary user 112, including the secondary user 114, the secondary user "Dad," and the secondary user "Josh." FIG. 7B illustrates an exemplary interfaces 702 that may be displayed to the primary user 112 at the communication device 118 upon selection of the secondary user 114 at the interface 700, to solicit an amount of funds to transfer to the secondary user 114, a repeat command, a spend control (e.g., "What is this for?," etc.), and a comment section (all broadly, fund transfer parameters). And, FIG. 7C illustrates the exemplary interface 702 with the fund transfer parameters included (i.e., a fund transfer of $22.00 that does not repeat and is for transportation, and specifically for subway fare for the rest of the week). Here, to complete the fund transfer (and transmit the fund transfer parameters to the transaction client 120 and/or the purchase platform 122), the primary user 112 can then select the "Send" button at the bottom of the interface 704.

Figure 8:
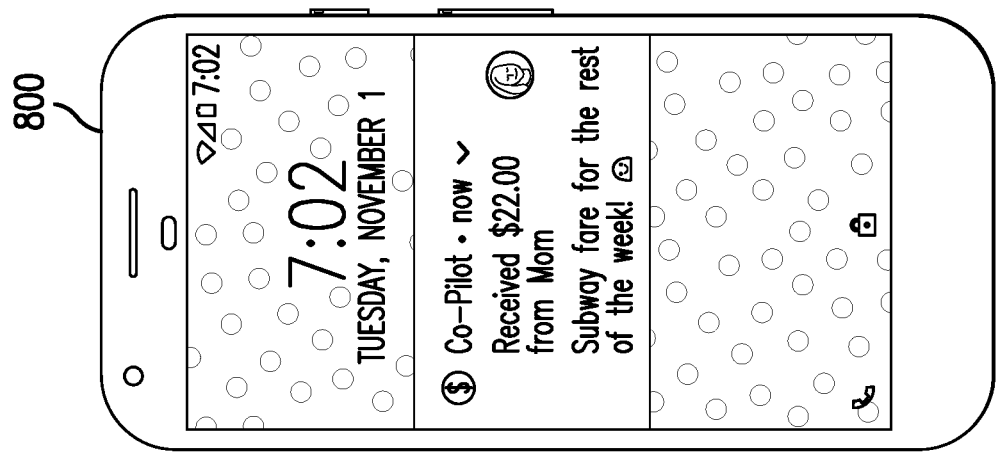

In turn in the method 500, the transaction client 120 and/or purchase platform 122 receives the fund transfer parameters from the primary user 112 and cause, at 518, the requested fund transfer to be performed/initiated (broadly, payment account transaction) consistent with the fund transfer parameters. Upon verification of the transfer, the transaction client 120 and/or purchase platform 122 sends one or more notifications, at 520, to the secondary user 114 to inform the secondary user 114 of the additional funds available for use in purchasing products. FIG. 8 illustrates an exemplary interface 800 that may be displayed to the secondary user 114 indicating that the fund transfer has occurred (i.e., a notification identifying the fund transfer of $22.00 from "Mom" with a comment that the funds are for "Subway fare for the rest of the week!").

Again and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) accessing a profile associated with a primary user, the profile including a payment account and an identification of a secondary user; (b) displaying an event log included in the profile, the event log including at least one transit purchase event associated with the secondary user; (c) soliciting at least one fund transfer parameter for a fund transfer to an account associated with the secondary user; (d) causing a fund transfer to the account, funded by the payment account and consistent with the at least one fund transfer parameter, whereby the primary user is permitted to provide funds for the purchase of transit by the secondary user; (e) displaying at least one available destination for travel, based on a profile associated with a user, the user associated with a payment account; (f) receiving a selection of the at least one available destination for travel, from the user; (g) in response to the selection of the at least one available destination, displaying at least one transit option to the user, the at least one transit option including travel for the user to the at least one available destination; and (h) in response to a selection of the at least one transit option, providing a credential associated with said payment account, whereby the credential is permitted to be captured by a point of sale (POS) computing device associated with a transit merchant for the selected at least one transit option for initiating a payment account transaction to the payment account for the user to travel to the at least one available destination.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

In addition, as used herein, a product may include a good, a service, etc.

None of the elements/features recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for facilitating purchase transactions for travel by a secondary user via funds provided to a payment account of the secondary user from an account of a primary user, the system comprising:
    a memory including a user profile associated with the primary user and a user profile associated with the secondary user, wherein the user profile associated with the primary user is linked to the user profile associated with the secondary user, and wherein the user profile associated with the secondary user includes a payment account and a listing of multiple predefined destinations defined by the primary user as destinations to which the secondary user is allowed to travel; and
    a communication device including a processor in communication with the memory, and including a network interface coupled to the processor, the processor configured to:
        access the user profile associated with the secondary user in the memory;
        determine, via the network interface, a location of the communication device;
        retrieve available destinations for travel by the secondary user, based on the determined location of the communication device, from the listing of the multiple predefined destinations included in the accessed user profile associated with the secondary user;
        display the available destinations to the secondary user;
        in response to a selection of one of the displayed available destinations from the secondary user, display at least one travel option to the secondary user for the selected one of the available destinations, the at least one travel option including travel for the secondary user to the selected one of the available destinations; and
        in response to a selection of one of the at least one travel option from the secondary user, provide a credential associated with the payment account of the secondary user, thereby permitting a point of sale (POS) computing device associated with a merchant of the selected one of the at least one travel option to capture the credential and initiate a purchase transaction for the selected one of the at least one travel option, funded by the payment account of the secondary user, to allow the secondary user to travel to the selected one of the available destinations.

2. The system of claim 1, wherein the processor is further configured to identify the at least one travel option based on the determined location of the communication device; and
    wherein the processor is configured, in order to display the at least travel option, to display the identified at least one travel option to the secondary user.

3. The system of claim 1, wherein the processor is configured, in order to provide a credential associated with the payment account, to cause a computer-readable indicia associated with the credential to be displayed at a presentation unit of the communication device, wherein the communication is device associated with the secondary user.

4. The system of claim 3, wherein the processor is further configured to:
    cause a payment account transaction to be initiated for a pass associated with the selected one of the at least one travel option; and
    display the pass at the presentation unit of the communication device associated with the secondary user.

5. The system of claim 1, further comprising a platform computing device in communication with the communication device;
    wherein the platform computing device is configured to:
        solicit, from the primary user, at least one fund transfer parameter to facilitate a transfer of funds from an account of the primary user to the payment account of the secondary user; and
        cause the transfer of funds, consistent with the at least one fund transfer parameter, to the payment account of the secondary user, whereby the primary user provides funds for the purchase of the selected one of the at least one travel option by the secondary user.

6. The system of claim 5, further comprising a communication device associated with the primary user and in communication with the platform computing device;
    wherein the communication device associated with the primary user is configured to provide the at least one fund transfer parameter to the platform computing device.

7. The system of claim 1, further comprising a platform computing device including the memory;
    wherein the platform computing device is configured to:
        access the user profile associated with the secondary user in the memory; and
        provide an event log to a communication device associated with the primary user based on the accessed user profile associated with the secondary user, the event log including a listing of multiple user events associated with travel of the secondary user.

8. The system of claim 7, wherein the event log includes one or more of a specific travel time for the at least one travel option, a specific travel route for the at least one travel option, and a cost associated with the at least one travel option.

9. A non-transitory computer-readable storage medium including executable instructions for facilitating a purchase that, when executed by at least one processor, cause the at least one processor to:
    access a profile of a secondary user, the profile including a payment account funded by a primary user and a listing of multiple predefined destinations defined by the primary user as destinations to which the secondary user is allowed to travel;
    determine, via a network interface associated with the at least one processor, a location of the at least one processor;
    retrieve available destinations for travel by the secondary user, based on the determined location, from the listing of multiple predefined destinations in the profile of the secondary user;
    display the retrieved available destinations to the secondary user;
    receive a selection of one of the retrieved available destinations from the secondary user;
    in response to the selection of the one of the available destinations, display at least one travel option to the secondary user specific to the selected one of the available destinations; and
    in response to a selection of the at least one travel option, provide a purchase request for the selected at least one travel option and a credential associated with the payment account of the secondary user to a merchant associated with the selected at least one travel option, whereby a point of sale (POS) computing device of the merchant captures the credential and initiates a purchase transaction consistent with the purchase request for the selected at least one travel option and whereby the purchase transaction is funded by the payment account of the secondary user as limited by the funding of the payment account by the primary user.

10. The non-transitory computer-readable storage medium of claim 9, wherein the executable instructions, when executed by the at least one processor, cause the at least one processor, in order to provide the credential, to display a computer-readable indicia representative of the credential; and
    wherein the computer-readable indicia includes one of a barcode and a QR code.

11. The non-transitory computer-readable storage medium of claim 9, wherein the executable instructions, when executed by the at least one processor, further cause the at least one processor to transmit a request for funds to the primary user associated with the secondary user, whereby the payment account of the secondary user is funded by the primary user.

\* \* \* \* \*